Dec. 20, 1955     A. H. HANSEN     2,727,437
EYEGLASS MOUNTINGS AND THE LIKE
Filed Sept. 24, 1951     2 Sheets-Sheet 1
FIG. 1.
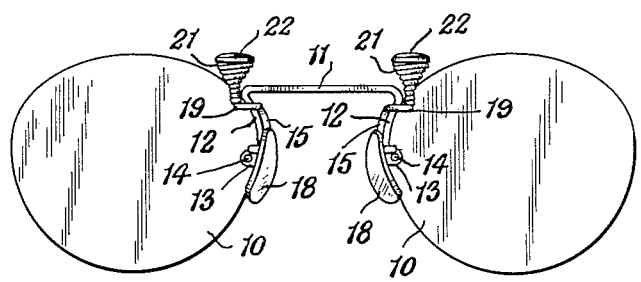
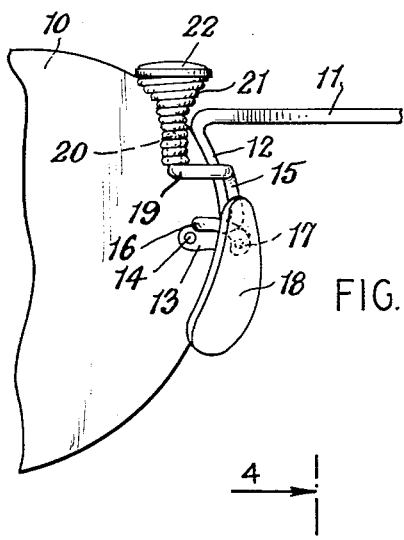
FIG. 2.
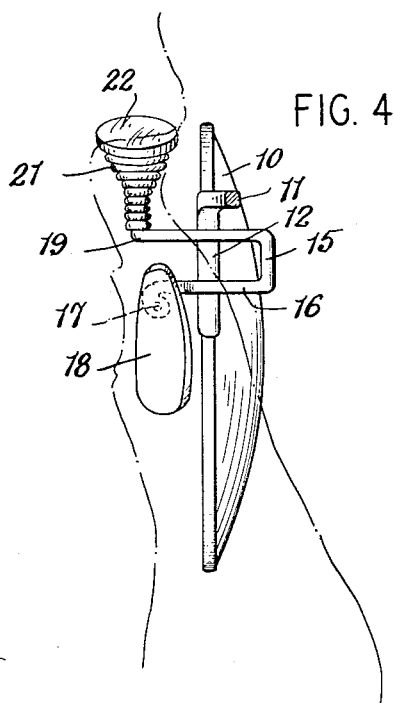
FIG. 4.
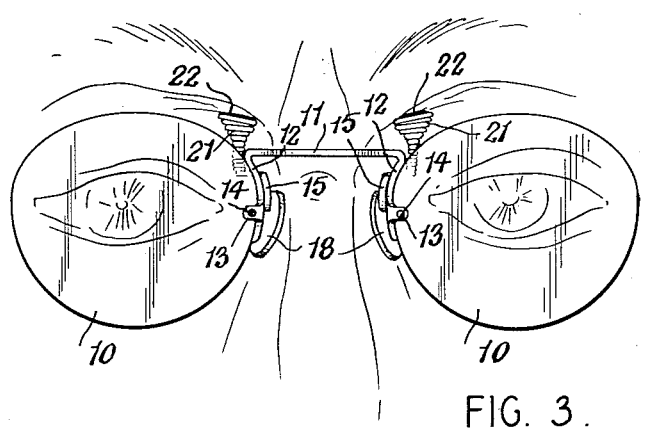
FIG. 3.
*INVENTOR.*
AAGE H. HANSEN
BY
*ATTORNEY.*

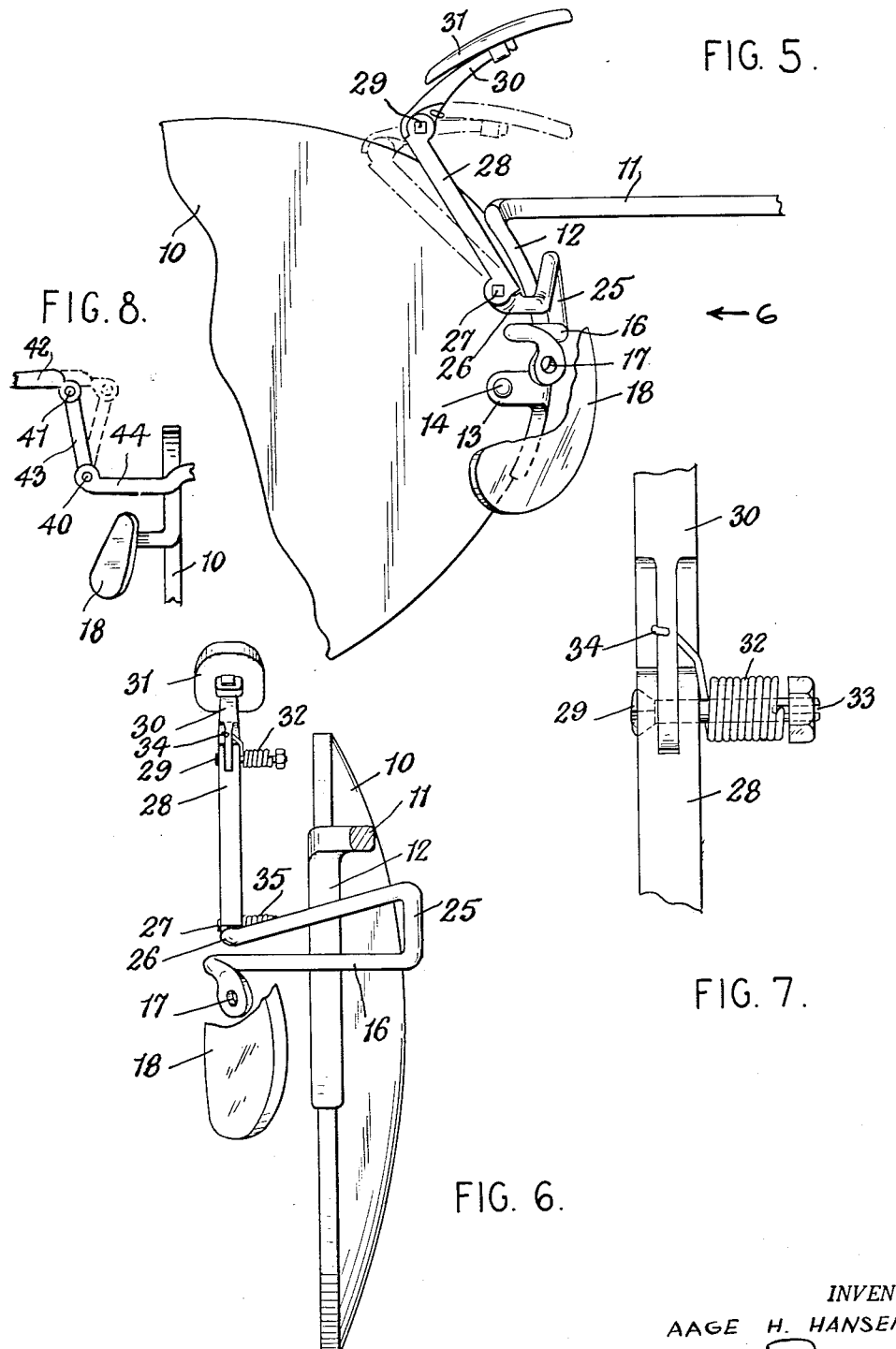

United States Patent Office 2,727,437
Patented Dec. 20, 1955

2,727,437

EYEGLASS MOUNTINGS AND THE LIKE

Aage H. Hansen, New York, N. Y.

Application September 24, 1951, Serial No. 247,970

1 Claim. (Cl. 88—41)

This invention relates to eyeglass mountings and the like, and more particularly to the type of eyeglass mounting shown and described in my Patent No. 2,478,921, dated August 16, 1949.

In the above patent is disclosed a mounting especially adapted for glasses of the rimless type in which the eyeglasses are held in proper position before the eyes without the employment of temples and without requiring gripping elements in engagement with the nose and which often cause discomfort to the eyeglass wearer. In said patent is suggested the use of a pair of leaf spring members rigidly connected to the lenses and curving upwardly and divergently and having pads at their free ends for engagement with the superorbital foramina.

The present invention contemplates improvements in the above described construction, but provides a different and improved form of means for engagement with the superorbital foramina, said means including, in one embodiment of the invention, a pair of coil springs tipped with pads and affording a direct upward pressure under the brows. In another embodiment of the invention, direct upward pressure under the brows is attained by spring-urged linkage incorporating a pair of pivotally connected links which secure the required resilience by torsional springs located at the point of pivotal connection between the links and at the point where the main link is connected at the bridge-piece of the eyeglasses.

The object, therefore, of the present invention is to provide a resilient means capable of exerting a direct upward and resilient pressure under the eyebrows and in engagement with the superorbital foramina, to thereby firmly hold the eyeglasses in proper position and without the imposition of pressure on the nose of the wearer.

Other objects and advantages inherent in the invention will become apparent from the following specification taken in conjunction with the accompanying drawings which show two different embodiments of the invention.

In the accompanying drawings, wherein two illustrative embodiments of the invention are disclosed, Fig. 1 is a front elevational view of a pair of eyeglasses constructed according to the invention;

Fig. 2 is an enlarged view from the rear of a part of the bridge of the eyeglasses, showing one of the eye-brow engaging spring members;

Fig. 3 is a front elevation of the eyeglasses as the same appear when being worn;

Fig. 4 is a sectional view, taken on the line 4—4 of Fig. 3, looking in the direction of the arrows;

Fig. 5 is an enlarged view of a part of a modified structure;

Fig. 6 is a side view of the structure of Fig. 5, looking at the same in the direction indicated by the arrow 6 in Fig. 5;

Fig. 7 is a side view of the spring pivot which connects the two links of the mounting together; and Fig. 8 is a view showing a modified construction.

Referring in greater detail to the embodiment of the invention illustrated in Figs. 1 to 4 of the drawings, the lenses 10 may or may not be rimless, and the rimless form illustrated are held in the properly spaced relation by the bridge 11 which has a pair of downwardly-extended legs 12 each provided with the lugs 13 between which one of the lenses is located and maintained by means of the fastening screw 14. Extending transversely of and secured to each leg 12 of the bridge is a substantially U-shaped frame 15, which has a lower leg 16 provided with an end to which a nose pad 18 is attached with a rocking or pivotal movement to enable the pad to adapt itself to nose contour.

The second, or upper leg 19 of the frame 15 is slightly longer than the leg 16 and thus extends rearwardly of the bridge 11 to a slightly greater extent than the leg 16, and said upper leg 19 terminates in an upturned end or extremity 20 fitted into and preferably secured within the lower or smaller convolutions of a conical coil spring 21. Said coil spring is positioned with its larger end disposed upwardly, and secured on the upper or larger end of the coil spring 21 is a pad 22.

From the construction above described, it will be apparent that there is presented at each side of the bridge-piece 11 and at the required distance to the rear thereof, an upwardly-extending conical coil spring 21 which has its axis disposed vertically and substantially parallel to the plane of each lens 10. Each of said springs carries a brow-engaging pad 22 at its upper and larger extremity. This arrangement is such that when the glasses are fitted in position of wear, the springs 21 will urge the pads 22 into resilient engagement with the superorbital or frontal bone adjacent the superorbital foramina which provide a fleshy or soft skin surface for a firm grip. The resilient nature of the coil springs is such that the same not only may be directly downwardly compressed when the glasses are fitted in position but can also have lateral, or forward, backward and sidewise resilient deformation to enable them to engage the pads 22 at precisely the correct positions to enable the glasses to be firmly held in place, yet without the application of undue pressure likely to cause discomfort.

In the embodiment of the invention shown in Figs. 5 to 7 inclusive, springiness or resiliency is attained in a slightly different manner. Therein is shown a frame 25 having the lower leg 16 similar to that described in respect to the structure of Figs. 1 to 4, and which receives the nose pad 18 in similar manner. The frame 25 is roughly triangular in shape and includes an upper leg 26 provided at its end with a pivot pin 27 on which is mounted one end of a link 28. The pin 27 has a square or non-round head which fits within a similarly shaped hole in the link 28 so that rotative movement of the pin will be caused by movement of the bar and vice versa. Provided in the opposite end of the link 28 is a pivot pin 29 on which is mounted one end of a bar 30 carrying a pad 31 at its free end. The pin 29 also has a square head which fits within a similarly shaped opening in the upper end of the link 28. Surrounding the pivot pin 29 is a torsional spring 32 which has one of its ends engaged in a slot 33 in the end of the pin 29, and its other end 34 engaging around the bar 30 near pin 29. A similar spring 35 is fitted around the pivot pin 27. The spring-actuated pivots 27 and 29 are thus caused to hold the parts 26, 28 and 30 normally in the position shown in full lines in Fig. 5. When the eyeglasses are fitted in position of wear, the spring-pivoted linkage causes the pads 31 to be firmly, yet resiliently held in contact with the eye-brows as heretofore explained. The manner in which the supporting structure for the pads 31 may be downwardly resiliently depressed or collapsed is shown in dot-and-dash lines in Fig. 5, to enable the device to be fitted to persons of different facial characteristics, yet firmly and resiliently maintain the eyeglasses in position of wear and without requiring pressure on the nose or the use of supporting temples on the eyeglasses.

In the embodiment of the invention shown in Figs. 5 to 7 inclusive, the axes of the pivots 27 and 29 are shown as being transverse to the planes of the lenses, so that the collapsing or flexing movement of the linkage on which the pads 31 are mounted is a sidewise one. A somewhat similar linkage is shown in the embodiment disclosed in Fig. 8, except that the pivots 40 and 41 therein shown have their axes disposed substantially parallel to the plane of the lenses. These pivots 40 and 41 are of the spring type, shown at 27 and 29, and when pressure is imposed on the pad 30 the linkage composed of the elements 43 and 44, will collapse or pivot downwardly and forwardly as indicated in dotted lines. This forward and upwardly imposed resilient pressure of the pads 42 develops a tendency to cause an inward push to be applied to the bottom of the lenses 10, thus directing this portion of the lenses toward the cheeks and preventing downward slip of the eyeglasses.

What I claim is:

An eyeglass frame comprising, a substantially rigid nose bridge having a pair of spaced downward extensions to each of which a lens is attached, a substantially U-shaped frame including spaced upper and lower legs attached immovably and transversely to each extension so that the closed end of the U extends forwardly of said bridge and the legs of the U extend rearwardly thereof, the lower leg of each frame having an end to which a nose pad is attached, the upper leg of each frame being bent outwardly behind the corresponding lens and being provided with an upturned end for location below the brow of the wearer, and a vertically mounted collapsible spring having a lower portion engaging the upturned end, said spring extending vertically upward from said upturned end and carrying a brow-engaging pad at its upper end, to provide a predominantly upward pressure under the brow and wedge the nose pads down over the nose as well as prevent tilting of the eyeglass frame about said nose pads.

References Cited in the file of this patent

UNITED STATES PATENTS

| | | |
|---|---|---|
| Re. 13,394 | Laughlin | May 3, 1910 |
| 540,138 | Borsh | May 28, 1885 |
| 654,523 | Critzer | July 24, 1900 |
| 709,574 | Finch | Nov. 11, 1902 |
| 1,161,699 | Laughlin | Nov. 23, 1915 |
| 1,939,534 | Aspenleiter | Dec. 12, 1933 |
| 2,478,921 | Hansen | Aug. 16, 1949 |